(12) United States Patent
Dion et al.

(10) Patent No.: US 7,760,760 B2
(45) Date of Patent: Jul. 20, 2010

(54) FACILITATING INTELLIGENT MARKING AND DISCARDING OF MPEG VIDEO PACKETS IN IP PACKET STREAM

(75) Inventors: Gino Dion, Embrun (CA); Joseph Andrew MacDonald, Ottawa (CA); Jared David McNeill, Kanata (CA)

(73) Assignee: Alcatel Lucent, Paris (FR)

( * ) Notice: Subject to any disclaimer, the term of this patent is extended or adjusted under 35 U.S.C. 154(b) by 357 days.

(21) Appl. No.: 11/998,106

(22) Filed: Nov. 28, 2007

(65) Prior Publication Data
US 2009/0135852 A1 May 28, 2009

(51) Int. Cl.
*H04J 3/16* (2006.01)
(52) U.S. Cl. .................. 370/466; 370/395.52; 370/474; 375/240.01
(58) Field of Classification Search .................. None
See application file for complete search history.

(56) References Cited

U.S. PATENT DOCUMENTS

| | | | |
|---|---|---|---|
| 6,788,690 B2 * | 9/2004 | Harri ..................... | 370/395.52 |
| 7,356,029 B2 * | 4/2008 | Kaku et al. .................. | 370/390 |
| 7,636,929 B2 * | 12/2009 | Park ............................. | 725/54 |
| 2002/0047899 A1 * | 4/2002 | Son et al. ..................... | 348/114 |
| 2006/0062200 A1 * | 3/2006 | Wang et al. .................. | 370/352 |
| 2006/0168133 A1 * | 7/2006 | Park et al. .................... | 709/219 |
| 2008/0022320 A1 * | 1/2008 | Ver Steeg .................... | 725/78 |
| 2008/0151881 A1 * | 6/2008 | Liu et al. ..................... | 370/389 |
| 2008/0181256 A1 * | 7/2008 | Schwartz et al. ............ | 370/486 |

OTHER PUBLICATIONS

Arun Viswanathan, et al., "Evolution of Multiprotocol Label Switching," IEEE Communications Magazine, May 1998.
Francois Le Faucheur, "IETF Multiprotocol Label Switching (MPLS) Architecture," Cisco Systems, France.

* cited by examiner

*Primary Examiner*—Bob A Phunkulh
(74) *Attorney, Agent, or Firm*—Galasso & Associates

(57) ABSTRACT

A computer-implemented method comprises a plurality of operations. An operation is performed for creating an IP packet containing MPEG (Moving Picture Experts Group) packets therein and having a header including a value computed using a respective bit value of each one of the MPEG packets. Thereafter, an operation is performed for analyzing the computed value to determine an importance of the MPED packets relative to decoded video quality of a video stream including the MPEG packets.

30 Claims, 2 Drawing Sheets

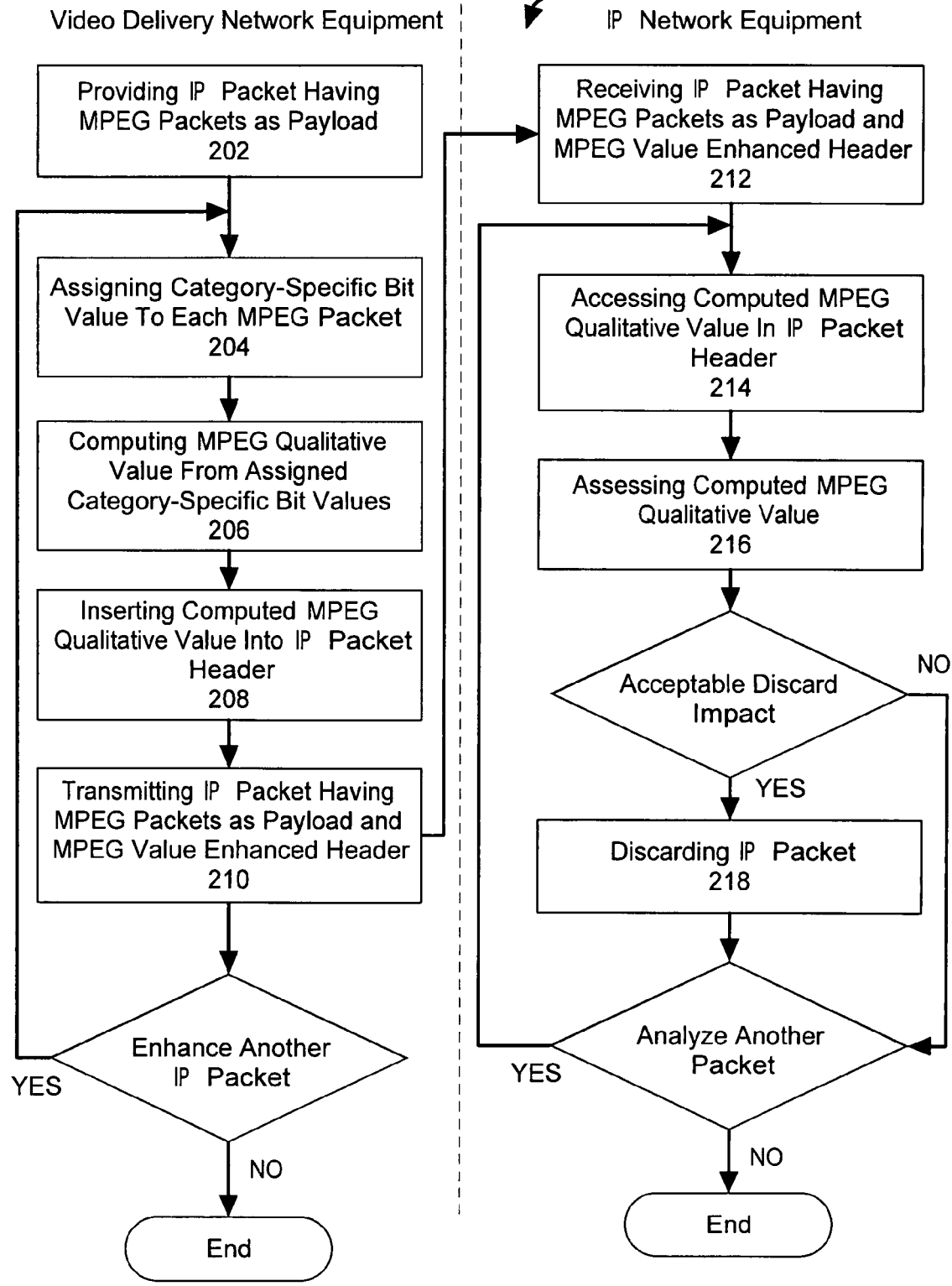

FACILITATING INTELLIGENT MARKING AND DISCARDING OF MPEG VIDEO PACKETS IN IP PACKET STREAM

FIELD OF THE DISCLOSURE

The disclosures made herein relate generally to facilitating transmission of MPEG video packets and, more particularly, to facilitating intelligent marking and discarding of MPEG video packets in IP packet streams.

BACKGROUND

During transmission of IP (Internet Protocol) packets carrying MPEG (Moving Picture Experts Group) payload, the need sometimes exists for discarding a portion of such IP packets. Examples of such situations include, but are not limited to, a network exhibiting congestion, facilitating fast-channel change functionality, performing various stream management functionalities, and the like. To facilitate such discarding in a manner that limits adverse impact on a quality of service (QOS) observed by a client, an IP device such as, for example, a router, switch, or DSLAM must first identify packets that can be discarded without adversely impacting such QOS.

Known approaches that exist for facilitating discarding of IP packets in an IP packet stream (i.e., packet stream traffic) exhibit one or more deficiencies. One such approach includes classifying the type of packet stream traffic using a corresponding IP TOS (Type of Service) field and a corresponding DSCP (Differentiated Services Code Point) values. Using this method, an IP device can classify "types" of packet stream traffic (e.g., voice, video, data, signalling, and so on), but has the deficiency of not being able to differentiate between the various degrees of importance of individual IP packets and contents thereof within those types. Another such approach includes performing MPEG analysis of a video stream (i.e., a packet stream known to be carrying video content) to determine its packet-specific content and, therefore, the qualitative value of such content relative to the overall video stream. This second approach has the deficiency of requiring task-specific hardware and/or software, which can significantly increase the cost and/or complexity of such an approach.

Therefore, an approach for allowing MPEG video packets of an IP packet stream to be discarded in a manner that limits adverse impact on the IP packet stream as-delivered to a recipient and that overcomes deficiencies associated with known approaches for discarding packets of packet stream traffic would be advantageous, desirable and useful.

SUMMARY OF THE DISCLOSURE

Embodiments of the present invention enable IP devices (e.g., router, switches, DSLAMS, etc) to very quickly and easily analyse the impact that a video stream exhibits as a result of dropping an IP packet having MPEG packets of that video stream. More specifically, embodiments of the present invention provide for a qualitative value of an MPEG payload (i.e., carried within an IP stream) to be conveyed directly within a header field of an IP packet of the IP video stream. For a given IP packet, the qualitative value corresponds to a qualitative impact of dropping an IP packet. Thus, in the case of congestion or for other stream management functionality, IP devices (e.g., routers, switches, DSLAMS and the like) can perform deterministic packet discard functionality dependent upon qualitative value of IP packets.

In one embodiment of the present invention, a computer-implemented method comprises a plurality of operations. An operation is performed for providing an IP (Internet Protocol) packet having MPEG (Moving Picture Experts Group) packets contained therein, followed by an operation being performed for assigning each one of the MPEG packets a respective bit value corresponding to an importance thereof relative to decoded video quality of a video stream including the MPEG packets. After assigning each one of the MPEG packets a respective bit value, an operation is performed for inserting into a header of the IP packet a value computed using the respective bit value of all of the MPEG packets.

In another embodiment of the present invention, a computer-implemented method comprises a plurality of operations. An operation is performed for creating an IP packet containing MPEG (Moving Picture Experts Group) packets therein and having a header including a value computed using a respective bit value of each one of the MPEG packets. Thereafter, an operation is performed for analyzing the computed value to determine an importance of the MPED packets relative to decoded video quality of a video stream including the MPEG packets.

In another embodiment of the present invention, a network system comprises a first packet processing apparatus and a second packet processing apparatus. The first packet processing apparatus is configured for creating an IP packet containing MPEG (Moving Picture Experts Group) packets therein and having a header including a value computed using a respective bit value of each one of the MPEG packets. The second packet processing apparatus is configured for accessing contents of the header of the IP packet and for analyzing the computed value to determine an impact of dropping the IP packet relative to decoded video quality of a video stream including the MPEG packets.

In still another embodiment of the present invention, a data storage device has a set of processor-executable instructions stored thereon. Instructions are provided thereon for providing an IP (Internet Protocol) packet having MPEG (Moving Picture Experts Group) packets contained therein. Instructions are provided thereon for assigning each one of the MPEG packets a respective bit value corresponding to an importance thereof relative to decoded video quality of a video stream including the MPEG packets. Instructions are provided thereon for inserting into a header of the IP packet a value computed using the respective bit value of all of the MPEG packets.

These and other objects, embodiments, advantages and/or distinctions of the present invention will become readily apparent upon further review of the following specification, associated drawings and appended claims.

BRIEF DESCRIPTION OF THE DRAWINGS

FIG. 2 shows a method in accordance with an embodiment of the present invention, which is configured for marking and discarding IP packets carrying MPEG payload.

DETAILED DESCRIPTION OF THE DRAWING FIGURES

Figure 1:
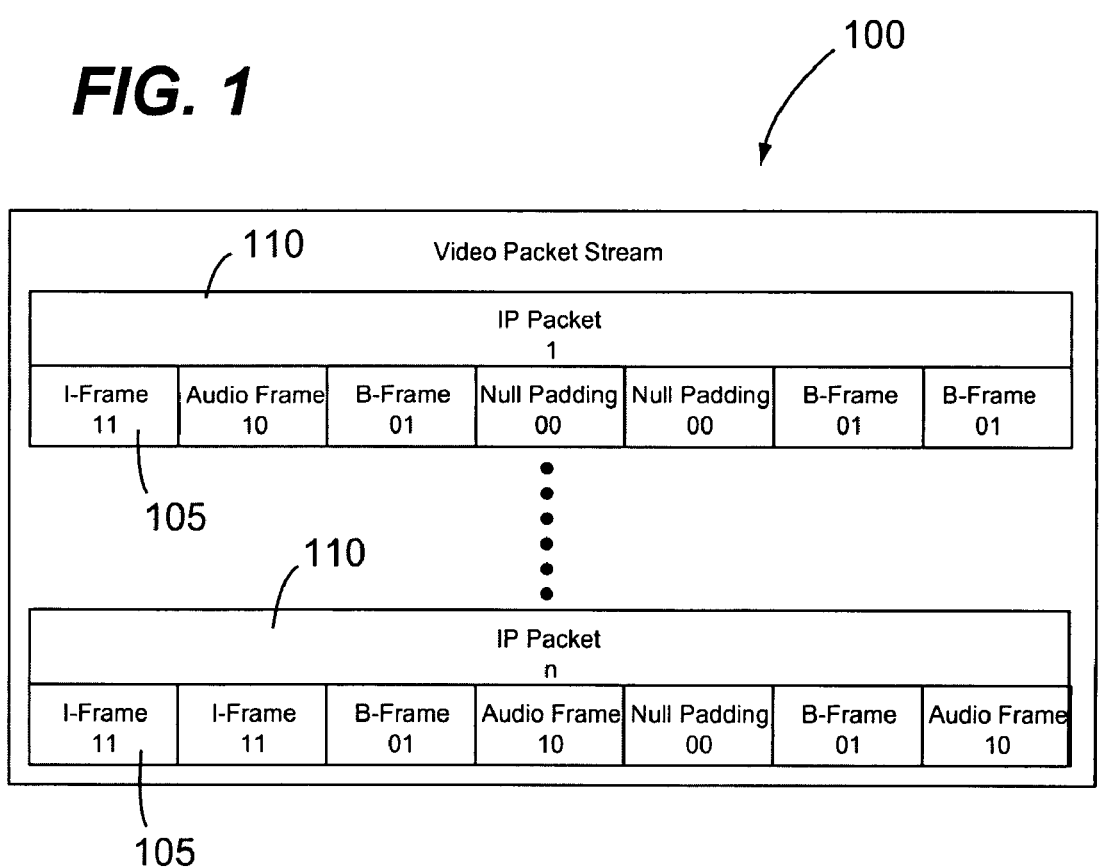
FIG. 1 shows a representation of a video packet stream having IP packets categorized using bit values in accordance with an embodiment of the present invention.

Various known types of MPEG (Moving Picture Experts Group) packets include, but are not limited to, I-Frames (i.e., full reference frames), B and P Frames, Audio Frames, Null packets and the like. In accordance with embodiments of the present invention, MPEG packets are categorized into different types. Each category of MPEG packet has a respective importance relative to decoded video quality of a video stream comprising a collection of MPEG packet. Accordingly, by categorizing a first set of known MPEG packet types in a second (i.e., smaller) set of MPEG packet categories, such MPEG packet categories can be used as a reference for an expected impact that discarding of a particular type of MPEG packet will have on decoded video quality of a given video stream.

In accordance with one embodiment of the present invention, MPEG packets fall within one of four different MPEG PDU categories. MPEG packets in each one of these MPEG packet categories have a respective importance (i.e., impact) relative to decoded video quality of a video stream. Table 1 below shows each one of these four different MPEG packet categories.

TABLE 1

MPEG packet Categories

| | |
|---|---|
| I-Frames | These frames carry a full video reference. This packet is very important to an MPEG decoder (Set-top-box, computer, etc.), if these frames get dropped or loss, serious video impact occurs and the quality of experience of the end-user suffers. |
| Audio Frames | These frames carry the audio tracks, and can be associated with specific video streams, or be standalone (in case of music only channels). Their importance is typically high (although not as high as I-Frames) because very often, the MPEG decoders will "sync" on the audio frames to perform the decoding of a stream. If the audio frames get lost, it can impact the video decoding. |
| P-B Frames | These carry a predictive (can be bi-directional) frame of reference, based on the last I-Frame received. Basically, they carry information about the part of the picture that has changed since the last I-Frame. If those are lost, in small quantity, the video impact is negligible to the end-user. Most MPEG decoders have error-concealment algorithms design to handle the loss of such frames. Also, start B-P Frames (the first in a series of) are also of relative significant importance. |
| Null Frames and Misc MPEG frames (PSI, PAT/PMT, etc.) | Null frames refer to "padding" inserted into IP (Internet Protocol) packets, in cases where there isn't enough MPEG information to fill in the 7 MPEG packet payload format discussed above. PAT/PMT/PSI tables are important for the start decode of a stream, but after that, they mostly become redundant. |

For this embodiment, a 2-bit value can be used for representing each type of MPEG packet category. More specifically, each different MPEG packet category has a respective 2-bit value associated therewith. Table 2 shows an embodiment of such a bit value associated for each one of the four MPEG packet categories.

TABLE 2

Bit Value Associations

| MPEG Packet Type | 2-Bit Value |
|---|---|
| I-Frame | 11 |
| Audio Frame | 10 |
| B or P Frame | 01 |
| Null or MISC | 00 |

In MPEG video delivery over IP, 7 MPEG packets are inserted into each IP packet. The MQV for a given IP packet corresponds to a relative impact that the MPEG packets of that IP packet have on decoded video quality of a given video stream. For example, encoders or other special devices can perform the necessary analysis at the front-end of a video delivery network (e.g., IPTV network) and insert the MQV into the header of the IP packet.

In accordance with one embodiment of the present invention, the "source port" field of the UDP (User Datagram Protocol) header of an IP packet is used to store a MPEG Qualitative Value (MQV). The "source port" field of the UDP header is 16 bits in length. Thus, it is long enough to store a compounded value of any possible combination of MPEG packets stored in an IP packet. If 2 bits of the 16-bit source port field are allocated to every MPEG packet in the IP packet, a matrix (i.e., bitmap) can be created for representing all of the possible combinations of MPEG packets stored in an IP packet.

FIG. 1 shows an embodiment of a video packet stream representation 100 having EP packets with bit value marked in the manner as described above. Each MPEG packet 105 of each IP packet 110 has a respective one of the bit values from Table 2 assigned thereto. Accordingly, in accordance with the present invention, a MQV can be computed for each one of the IP packets 110. Table 3 (below) shows examples of binary and the corresponding decimal MQV value for IP packets of the video packet stream representation 100 shown in FIG. 1. Thus, in accordance with the disclosures made herein, a skilled person will understand that a binary MQV can be derived for each IP packet and a corresponding decimal MQV can be computed based on the corresponding binary MQV.

TABLE 3

IP Packets MQV Values

| IP Packet | Binary MQV | Decimal MQV |
|---|---|---|
| 1 | 11100100000101 | 14597 |
| ... | ... | ... |
| n | 11110110000110 | 15750 |

Using the MQV as a means of marking each IP packet (i.e., packet marking functionality), any IP device can then perform packet discard functionality based on the MQV of each IP packet. By only discarding a particular IP packets when it has been determined (i.e., through analyzing the MQV) that an impact of discarding that particular IP will not exceed a prescribed degree of adverse impact on decoded video quality of a respective video stream, embodiments of the present invention greatly increase the Quality of Experience (QOE) of the IPTV and the like. Furthermore, marking and discarding functionality in accordance with the present invention can be applied jointly or separately to existing congestion control mechanisms or even to Instant/Fast Channel change methods as well.

A key value of the present invention resides in the fact that marking and/or discarding functionality in accordance with the present invention does not rely on the use of the IP Type of Service (TOS) field to carry marking information. Disadvantageously, prior art approaches of using the TOS field for marking and/or discarding functionality limits such functionality to only using Quality of Service (QOS)/Differentiated Services Code Point (DSCP) based mechanisms, or only using 2 available Explicit Congestion Notification (ECN) bit, for a possible combination of 4 MPEG payload scenarios, versus the full 16383 MPEG payload scenarios provided for by embodiments of the present invention. Furthermore, embodiments of the present invention do not require IP equipment to perform any MPEG video analysis and/or decode. Still further, marking and discarding functionality in accordance with the present invention can be applied to content that is encrypted via an encryption protocol such as, for example, Digital Rights management (DRM), as long as the value is inserted prior to implementing the DRM application.

Referring now to FIG. 2, a method 200 in accordance with an embodiment of the present invention is shown, which can include the marking and discarding functionality disclosed above. The method 200 is configured for marking and discarding IP packets carrying MPEG payload in a manner as disclosed with respect to Tables 1-3 and FIG. 1. Accordingly, the method 200 is configured for allowing IP packets carrying MPEG payload to be marked and discarded in a manner that results in an expected and/or acceptable impact on decoded video quality of a given video stream. It is disclosed herein that the method 100 is configured for being jointly carried out by video delivery network equipment (e.g., equipment of an IPTV network) and by IP network equipment (e.g., equipment of an access network).

The method 200 begins with an operation 202 being performed for providing an IP packet having MPEG packets contained therein. Examples of providing an IP packet include receiving the IP packet and creating the IP packet. Thereafter, an operation 204 is performed for assigning each one of the MPEG packets a respective bit value corresponding to an importance thereof relative to decoded video quality of a video stream including the MPEG packets, followed by an operation 206 being performed for computing an MPEG Qualitative Value (MQV) using the respective bit value of all of the MPEG packets. In response to computing the MQV, an operation 208 is performed for inserting the MQV into a header of the IP packet, thereby creating an IP packet having a header enhanced in accordance with the present invention (i.e., header-enhanced IP packet). In one embodiment, the MQV is preferably inserted into the source port field of the UDP header of the IP packet. The header-enhanced IP packet is then transmitted for reception by IP network equipment configured in accordance with the present invention.

In response to the IP network equipment performing an operation 212 for receiving the header-enhanced IP packet, an operation 214 is performed for accessing the MQV in the IP header. In response to accessing the MQV, an operation 216 is performed for analyzing the MQV for determining an impact of discarding the IP packet. In one embodiment, such analyzing includes determining whether discarding the IP packet exceeds a prescribed degree of adverse impact on decoded video quality of a video stream comprising the MPEG packets contained within the header-enhanced IP packet. In response to determining that the impact of discarding the header enhanced IP packet will not exceed the prescribed degree of adverse impact on such decoded video quality, an operation 218 is performed for discarding the header-enhanced IP packet. Otherwise, the header-enhanced IP packet is not discarded.

As can be seen in FIG. 2, in one embodiment of the present invention, various components of a network system carry out respective operations of method for facilitating marking and discarding functionality in accordance with the present invention. More specifically, in one embodiment, a first packet processing apparatus is configured for creating an IP packet containing MPEG packets therein and having a header including a value computed using a respective bit value of each one of the MPEG packets, whereas a second packet processing apparatus is configured for analyzing the computed value to determine an impact of dropping the IP packet relative to decoded video quality of a video stream including the MPEG packets. Preferably, but not necessarily, the first packet processing apparatus is an apparatus within a video delivery network and the second packet processing apparatus is an apparatus external to the video delivery network (e.g., an IP device).

Referring now to instructions processable by a data processing device (i.e., a set of processor executable instructions), it will be understood from the disclosures made herein that methods, processes and/or operations adapted for carrying out packet marking and discarding functionality as disclosed herein are tangibly embodied by computer readable medium having instructions thereon that are configured for carrying out such functionality. In one specific embodiment, the instructions are tangibly embodied for carrying out the method 200 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out packet marking and discarding functionality in accordance with the present invention.

In the preceding detailed description, reference has been made to the accompanying drawings that form a part hereof, and in which are shown by way of illustration specific embodiments in which the present invention may be practiced. These embodiments; and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A computer-implemented method, comprising:
    providing an IP (Internet Protocol) packet having MPEG (Moving Picture Experts Group) packets contained therein;
    assigning each one of said MPEG packets a respective bit value corresponding to an importance thereof relative to decoded video quality of a video stream including said MPEG packets; and
    inserting into a header of the IP packet a value computed using the respective bit value of all of said MPEG packets,
    wherein said computed value is a decimal equivalent of a binary value representing an overall importance of said MPEG packets.

2. The method of claim 1, further comprising:
    accessing said computed value for assessing an impact of discarding the IP packets on said decoded video quality of the video stream; and
    discarding the IP packet in response to determining that the impact does not exceed a prescribed degree of adverse impact.

3. The method of claim 2 wherein:
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

4. The method of claim 2 wherein inserting said computed value into the header of the IP packet includes inserting said computed value into a source port field of a UPD header of the IP packet.

5. The method of claim 1 wherein inserting said computed value into the header of the IP packet includes inserting said computed value into a source port field of a UPD header of the IP packet.

6. The method of claim 1 wherein:
each one of said MPEG packets corresponds to a respective category of MPEG packet; and
each one of said MPEG packet categories has a respective importance relative to said decoded video quality.

7. The method of claim 1 wherein:
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

8. The method of claim 1 wherein:
each one of said MPEG packets corresponds to one of four different categories of MPEG packets; and
each one of said MPEG packet categories has a respective importance relative to said decoded video quality.

9. The method of claim 8 wherein inserting said computed value into the header of the IP packet includes inserting said computed value into a source port field of a UPD header of the IP packet.

10. A computer-implemented method, comprising:
creating an IP packet containing MPEG (Moving Picture Experts Group) packets therein and having a header including a value computed using a respective bit value of each one of said MPEG packets; and
analyzing said computed value to determine an importance of said MPED packets relative to decoded video quality of a video stream including said MPEG packets,
wherein said computed value is a decimal equivalent of a binary value representing an overall importance of said MPEG packets.

11. The method of claim 10, further comprising:
discarding the IP packet in response to determining that the impact does not exceed a prescribed degree of adverse impact.

12. The method of claim 10 wherein:
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

13. The method of claim 10 wherein:
the header is a UPD header; and
said computed value resides in a source port field of the UPD header.

14. The method of claim 13, further comprising:
discarding the IP packet in response to determining that the impact does not exceed a prescribed degree of adverse impact,
wherein the IP packet has 7 MPEG packets contained therein;
wherein each one of said MPEG packets corresponds to one of four different categories of MPEG packets;
wherein each one of said MPEG packet categories has a respective importance relative to said decoded video quality; and
wherein the bit value assigned to each one of said MPEG packets is a 2-bit value.

15. A network system, comprising
a first packet processing apparatus configured for creating an IP packet containing MPEG (Moving Picture Experts Group) packets therein and having a header including a value computed using a respective bit value of each one of said MPEG packets; and
a second packet processing apparatus configured for accessing contents of the header of the IP packet and for analyzing said computed value to determine an impact of dropping the IP packet relative to decoded video quality of a video stream including said MPEG packets,
wherein said computed value is a decimal equivalent of a binary value representing an overall importance of said MPEG packets.

16. The network system of claim 15 wherein:
the first packet processing apparatus is an apparatus within a video delivery network; and
the second packet processing apparatus is an apparatus external to the video delivery network.

17. The network system of claim 15 wherein the second packet processing apparatus is an IP device.

18. The network system of claim 15 wherein the second packet processing apparatus is configured for discarding the IP packet in response to determining that the impact does not exceed a prescribed degree of adverse impact.

19. The network system of claim 15 wherein:
the IP packet has 7 MPEG packets contained therein;
each one of said MPEG packets corresponds to one of four different categories of MPEG packets;
each one of Said MPEG packet categories has a respective importance relative to said decoded video quality; and
the bit value assigned to each one of said MPEG packets is a 2-bit value.

20. The network system of claim 15 wherein:
the header is a UPD header; and
said computed value resides in a source port field of the UPD header.

21. The network system of claim 20 wherein:
the second packet processing apparatus is configured for discarding the IP packet in response to determining that the impact does not exceed a prescribed degree of adverse impact,
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

22. A data storage device having a set of processor-executable instructions stored thereon, the set of processor-executable instructions comprising:

instructions for providing an IP (Internet Protocol) packet having MPEG (Moving Picture Experts Group) packets contained therein;

instructions for assigning each one of said MPEG packets a respective bit value corresponding to an importance thereof relative to decoded video quality of a video stream including said MPEG packets; and instructions for inserting into a header of the IP packet a value computed using the respective bit value of all of said MPEG packets, wherein said computed value is a decimal equivalent of a binary value representing an overall importance of said MPEG packets.

23. The data storage device of claim 22, further comprising:

instructions for accessing said computed value for assessing an impact of discarding the IP packets on said decoded video quality of the video stream; and instructions for discarding the IP packet in response to determining that the impact does not exceed a prescribed degree of adverse impact.

24. The data storage device of claim 23 wherein:
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

25. The data storage device of claim 23 wherein inserting said computed value into the header of the IP packet includes inserting said computed value into a source port field of a UPD header of the IP packet.

26. The data storage device of claim 22 wherein inserting said computed value into the header of the IP packet includes inserting said computed value into a source port field of a UPD header of the IP packet.

27. The data storage device of claim 22 wherein:
each one of said MPEG packets corresponds to a respective category of MPEG packet; and
each one of said MPEG packet categories has a respective importance relative to said decoded video quality.

28. The data storage device of claim 22 wherein:
the IP packet has 7 MPEG packets contained therein;
each one of said MPEG packets corresponds to one of four different categories of MPEG packets;
each one of said MPEG packet categories has a respective importance relative to said decoded video quality; and
the bit value assigned to each one of said MPEG packets is a 2-bit value.

29. The data storage device of claim 22 wherein:
each one of said MPEG packets corresponds to one of four different categories of MPEG packets; and
each one of said MPEG packet categories has a respective importance relative to said decoded video quality.

30. The data storage device of claim 29 wherein inserting said computed value into the header of the IP packet includes inserting said computed value into a source port field of a UPD header of the IP packet.

* * * * *